US007193596B2

(12) United States Patent
Shibata et al.

(10) Patent No.: US 7,193,596 B2
(45) Date of Patent: Mar. 20, 2007

(54) DISPLAY APPARATUS WITH REDUCED NOISE EMISSION AND DRIVING METHOD FOR DISPLAY APPARATUS

(75) Inventors: Hiroyuki Shibata, Kawasaki (JP); Yoshiro Murayasu, Kawasaki (JP); Satoshi Watanabe, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/760,883

(22) Filed: Jan. 17, 2001

(65) Prior Publication Data

US 2001/0026252 A1 Oct. 4, 2001

(30) Foreign Application Priority Data

Mar. 31, 2000 (JP) ............................ 2000-099149

(51) Int. Cl.
*G02F 1/33* (2006.01)

(52) U.S. Cl. ............................ 345/94; 345/87; 345/99; 345/204; 348/536

(58) Field of Classification Search .................. 345/60, 345/87, 99, 147, 204, 213, 94; 348/536
See application file for complete search history.

(56) References Cited

U.S. PATENT DOCUMENTS

| | | | | |
|---|---|---|---|---|
| 3,889,225 | A * | 6/1975 | McKenzie et al. | 327/114 |
| 3,906,482 | A * | 9/1975 | Morrison | 345/82 |
| 4,305,091 | A * | 12/1981 | Cooper | 348/619 |
| 4,715,688 | A | 12/1987 | Harada et al. | 350/350 |
| 5,206,729 | A * | 4/1993 | Nakata et al. | 348/594 |
| 5,610,955 | A | 3/1997 | Bland | 375/376 |
| 5,699,005 | A | 12/1997 | Menkhoff et al. | 327/292 |
| 5,748,165 | A * | 5/1998 | Kubota et al. | 345/96 |
| 5,757,338 | A | 5/1998 | Bassetti et al. | 345/3 |
| 5,917,461 | A * | 6/1999 | Sakami et al. | 345/29 |
| 5,995,076 | A * | 11/1999 | Tsuboyama et al. | 345/97 |
| 6,037,917 | A * | 3/2000 | Kawakami | 345/63 |
| 6,076,171 | A * | 6/2000 | Kawata | 713/501 |
| 6,130,420 | A * | 10/2000 | Tanaka et al. | 250/208.1 |
| 6,295,042 | B1 * | 9/2001 | Aoki | 345/94 |
| 6,339,422 | B1 * | 1/2002 | Kuwajima et al. | 345/204 |

(Continued)

FOREIGN PATENT DOCUMENTS

EP 0163313 12/1985

(Continued)

OTHER PUBLICATIONS

Jagdt, Holger; Reduction of noise current in microprocessor systems; Oct. 22, 1992 Pub. No. DE004112672A1; Doc. Identifier: DE 4112672 A1.*

*Primary Examiner*—Bipin Shalwala
*Assistant Examiner*—Vincent E. Kovalick
(74) *Attorney, Agent, or Firm*—Staas & Halsey LLP

(57) ABSTRACT

A display apparatus has a clock generating circuit, a drive waveform generating circuit, and a display panel. The drive waveform generating circuit is used to generate a drive waveform by using a clock from the clock generating circuit, and the display panel is used to display an image in accordance with the drive waveform. The clock generating circuit generates a clock whose frequency varies continuously. The drive waveform generating circuit drives the display panel by outputting a drive waveform whose frequency varies in accordance with the frequency varying clock so as to spread out noise that the display panel emits. Therefore, peak values of the noise can be reduced.

4 Claims, 14 Drawing Sheets

U.S. PATENT DOCUMENTS

| | | | | |
|---|---|---|---|---|
| 6,397,343 | B1 * | 5/2002 | Williams et al. | 713/501 |
| 6,518,943 | B1 | 2/2003 | Masumura | |

FOREIGN PATENT DOCUMENTS

| | | |
|---|---|---|
| EP | 0416423 | 3/1991 |
| EP | DE 19633013 | 2/1998 |
| EP | 0969660 | 1/2000 |
| GB | 2020075 | 11/1979 |
| JP | 10-149136 | 6/1998 |
| KR | 1999-0081215 | 11/1999 |

* cited by examiner

DISPLAY APPARATUS WITH REDUCED NOISE EMISSION AND DRIVING METHOD FOR DISPLAY APPARATUS

BACKGROUND OF THE INVENTION

1. Field of the Invention

The present invention relates to a display apparatus and a method for driving the same, and more particularly to a technique for reducing noise that a display apparatus such as a plasma display panel emits.

2. Description of the Related Art

Recently, a variety of display apparatuses have been researched and developed, and among them, plasma display panels (PDPS) and liquid crystal displays (LCDs) have been commercially implemented as flat display apparatuses having excellent display quality.

In these display apparatuses, the display panel is driven by a drive waveform generated in accordance with a fixed-frequency clock, and since the display panel is exposed to the outside, noise emission becomes a problem. To reduce noise below a specified level, it is practiced to adjust the shape of the display panel driving waveform (rise/fall shapes) or to provide a shield structure by attaching a conductive transparent film to the display panel. However, these techniques involve problems in terms of stable operation of the display apparatus and the cost of the apparatus, and drastic measures for solution are needed.

For example a clock circuit of a prior art plasma display apparatus is configured as a fixed-type clock oscillator. Generally, when an electronic apparatus operates, electromagnetic waves propagate through a medium such as space or electric wire as the current and voltage vary. In the case of a plasma display apparatus, these include visible light rays produced as the display light, and near infrared rays, magnetic field waves, electric field waves, etc. are emitted depending on differences in wavelength. In this case, all components other than the visible light rays intended for the operation of the apparatus can be defined as noise.

These components (noise), depending on their wavelength and strength, can cause malfunctioning or failure of other apparatuses located nearby, if this situation were left unaddressed, a valid environment for electronic apparatuses could not be provided. Therefore, in each country of the world, upper limits of noise that electronic apparatuses are permitted to emit are specified by law, self-imposed restrictions among manufactures, etc., and products conforming to the law, self-imposed restrictions, etc. by reducing noise using various means are distributed in the market.

The prior art and the problems associated with the prior art will be described in detail later with reference to accompanying drawings.

SUMMARY OF THE INVENTION

An object of the present invention is to provide a display apparatus that can reduce the intensity of noise over the entire frequency range concerned, while avoiding degradation in various characteristics.

According to the present invention, there is provided a driving method for a display apparatus, wherein a clock used for driving a display panel is continuously varied in frequency, and the display panel is driven with the frequency varying clock so as to spread out noise that the display panel emits, and thereby reducing peak values of the noise.

The clock used for driving the display panel may be a source clock of the display apparatus. The clock used for driving the display panel continuously may vary within a range of plus or minus a few percent of a reference frequency.

According to the present invention, there is also provided a driving method for a display apparatus, wherein at least two frequencies are provided for a clock used for driving a display panel, by sequentially switching the clock between the at least two frequencies, the display panel is driven with the switched clock so as to spread out noise that the display panel emits, and thereby reducing peak values of the noise.

Two frequencies lying within plus or minus a few percent of a reference frequency may be set for the clock used for driving the display panel.

Further, according to the present invention, there is provided a driving method for a driving method for a display apparatus, wherein drive waveforms for a display panel are provided corresponding to at least two frequencies, and the display panel is driven by sequentially switching an output drive waveform between the drive waveforms corresponding to the at least two frequencies so as to spread out noise that the display panel emits, and thereby reducing peak values of the noise.

The drive waveforms for the display panel may be provided corresponding to two frequencies lying within plus or minus a few percent of a reference frequency.

The display apparatus may be a plasma display apparatus. Control of the clock used for driving the display panel may be performed during a quiescent period (the period remaining after subtracting the operating period of one frame from Vsync).

According to the present invention, there is provided a display apparatus comprising a clock generating circuit, a drive waveform generating circuit for generating a drive waveform by using a clock from the clock generating circuit, and a display panel for displaying an image in accordance with the drive waveform, wherein the clock generating circuit generates a clock whose frequency varies continuously, and the drive waveform generating circuit drives the display panel by outputting a drive waveform whose frequency varies in accordance with the frequency varying clock so as to spread out noise that the display panel emits, and thereby reducing peak values of the noise.

The clock generating circuit may generate the source clock of the display apparatus. The clock generating circuit may generate a clock whose frequency varies continuously within a range of plus or minus a few percent of a reference frequency.

According to the present invention, there is also provided a display apparatus comprising a clock generating circuit, a drive waveform generating circuit for generating a drive waveform by using a clock from the clock generating circuit, and a display panel for displaying an image in accordance with the drive waveform, wherein the clock generating circuit generates a clock sequentially switched between at least two frequencies, and the drive waveform generating circuit drives the display panel by outputting a drive waveform whose frequency switches in accordance with the switched clock so as to spread out noise that the display panel emits, and thereby reducing peak values of the noise.

The clock generating circuit may generate a clock sequentially switched between two frequencies lying within plus or minus a few percent of a reference frequency. Further, according to the present invention, there is provided a display apparatus comprising a clock generating circuit, a drive waveform generating circuit for generating a drive waveform by using a clock from the clock generating circuit, and a display panel for displaying an image in accordance with the drive waveform, wherein the drive waveform generating circuit drives the display panel by sequentially switching an output drive waveform between drive waveforms corresponding to at least two frequencies so as to spread out noise that the display panel emits, and thereby reducing peak values of the noise.

The drive waveform generating circuit may sequentially switch the output drive waveform between drive waveforms corresponding to two frequencies lying within plus or minus a few percent of a reference frequency.

The display apparatus may be a plasma display apparatus. During a quiescent period the clock generating circuit may perform control of the clock used for driving the display panel.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

Before proceeding to the detailed description of the display apparatus and the driving method for the apparatus according to the present invention, a prior art display technique and the problems associated with the prior art technique will be described with reference to FIGS. 1 to 6.

Figure 1:
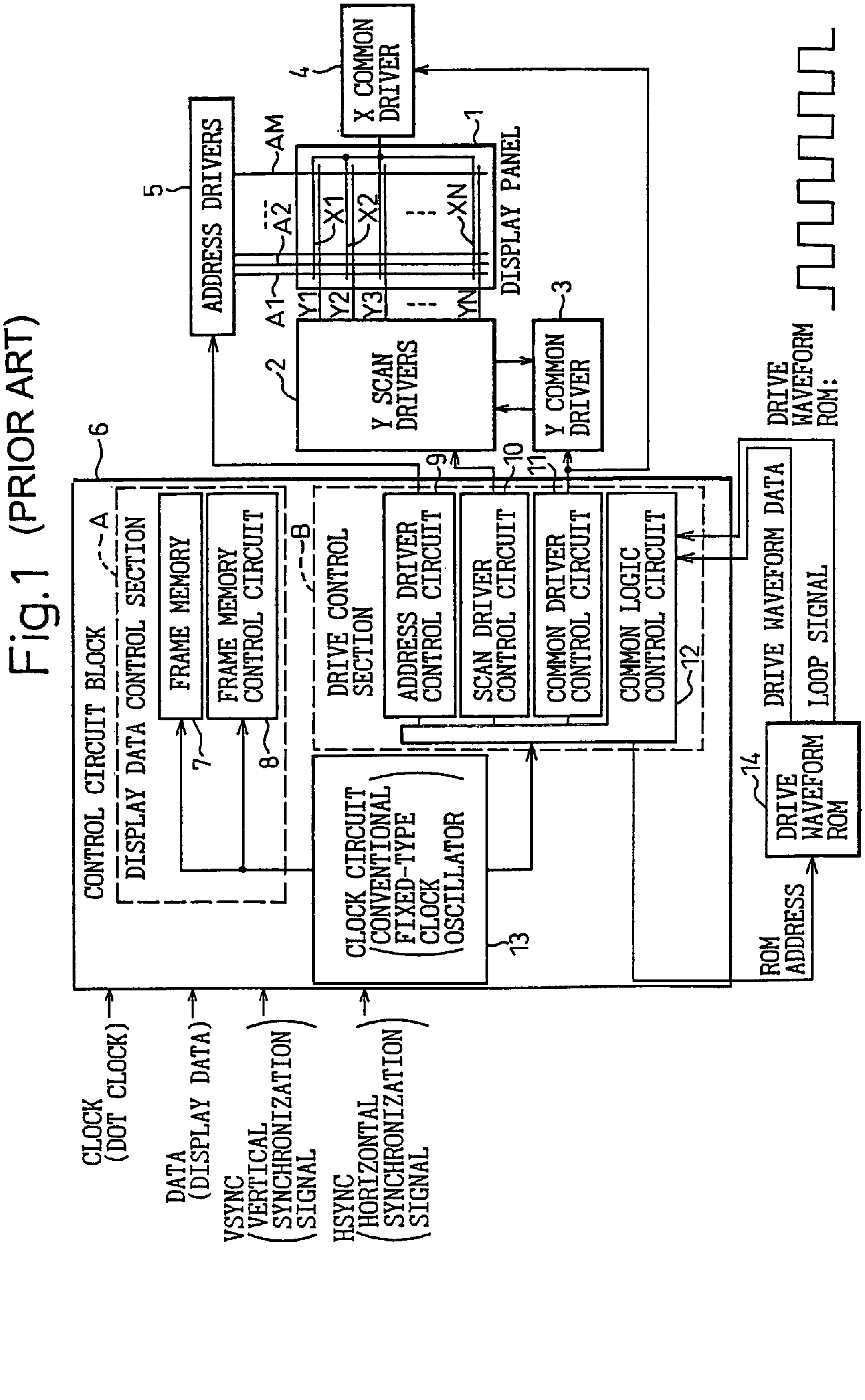
Fig.1 (PRIOR ART)
FIG. 1 is a block diagram showing a plasma display apparatus as one example of a prior art display apparatus.

FIG. 1 is a block diagram showing a plasma display apparatus (three-electrode surface discharge AC-driven type, so called three-electrode AC-type, plasma display apparatus) as one example of a prior art display apparatus. In FIG. 1, reference numeral 1 is a display panel, 2 is an array of Y scan drivers, 3 is a Y common driver, 4 is an X common driver, 5 is an array of address drivers, and 6 is a control circuit block.

The display panel 1 comprises two glass substrates disposed opposite each other, one substrate being provided with Y electrodes Y1 to YN and X electrodes x1 to XN, i.e., sustain-discharge electrodes arranged parallel to each other, and the other substrate with address electrodes A1 to AM arranged at right angles to the sustain-discharge electrodes (X and Y electrodes). The Y electrodes (scan electrodes) Y1 to YN are driven by the Y scan drivers 2, x electrodes X1 to XN are connected together and driven by the X common driver 4, and the address electrodes A1 to AM are driven by the address drivers 5.

The control circuit block 6 comprises a display data control section A having a frame memory 7 and frame memory control circuit 8, a clock circuit (conventional fixed-type clock oscillator) 13, and a drive control section B having an address driver control circuit 9, scan driver control circuit 10, common driver control circuit 11, and common logic control circuit 12. The control circuit block 6 receives a dot clock (CLOCK), display data (DATA), vertical synchronization signal (VSYNC), and horizontal synchronization signal (HSYNC), and displays the desired image on the display panel 1 by controlling the Y scan drivers 2, Y common driver 3, x common driver 4, and address drivers 5.

The clock circuit 13 is configured as a conventional fixed-type clock oscillator, and its output (clock signal) is supplied to the frame memory 7, frame memory control circuit 8, and common logic control circuit 12. A drive waveform ROM 14 receives an address signal (ROM address) from the common logic control circuit 12, and supplies corresponding drive waveform data and a loop signal to the common logic control circuit 12.

In the prior art plasma display apparatus, for example, the clock circuit 13 is configured as a fixed-type clock oscillator, as described above.

Generally, when an electronic apparatus operates, electromagnetic waves propagate through a medium such as space or electric wire as the current and voltage vary. In the case of a plasma display apparatus, these include visible light rays produced as the display light, and near infrared rays, magnetic field waves, electric field waves, etc. are emitted depending on differences in wavelength; in this case, all components other than the visible light rays intended for the operation of the apparatus can be defined as noise. These components (noise), depending on their wavelength and strength, can cause malfunctioning or failure of other apparatuses located nearby; if this situation were left unaddressed, a valid environment for electronic apparatuses could not be provided. Therefore, in each country of the world, upper limits of noise that electronic apparatuses are permitted to emit are specified by law, self-imposed restrictions among manufactures, etc., and products conforming to the law, self-imposed restrictions, etc. by reducing noise using various means are distributed in the market.

Figure 2:
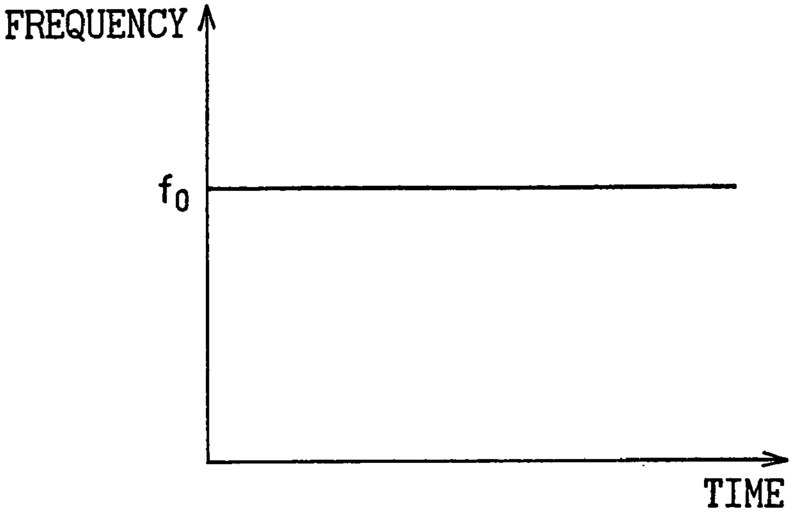
Fig.2 (PRIOR ART)
FIG. 2 is a diagram showing the frequency versus time relationship of the clock (fixed clock) used in the prior art plasma display apparatus shown in FIG. 1.
Figure 3:
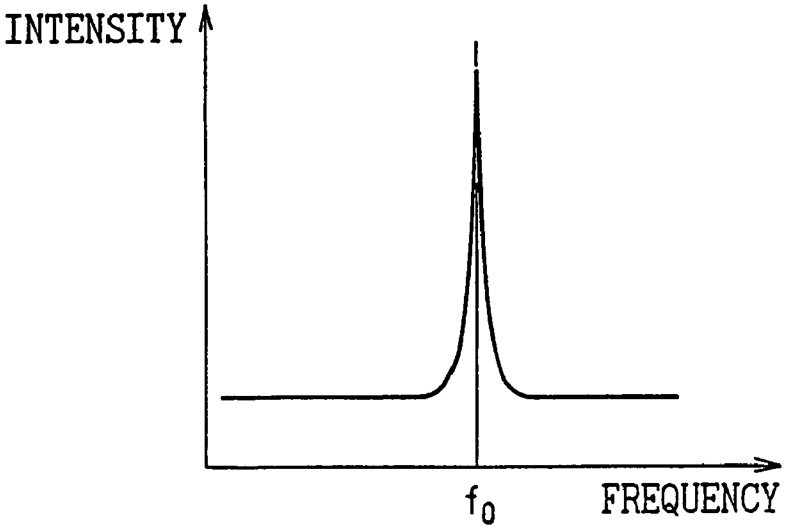
Fig.3 (PRIOR ART)
FIG. 3 is a diagram showing the intensity versus frequency relationship of the fixed clock shown in FIG. 2.

FIG. 2 is a diagram showing the frequency versus time relationship of the clock (fixed clock) used in the prior art plasma display apparatus shown in FIG. 1, and FIG. 3 is a diagram showing the intensity versus frequency relationship of the fixed clock shown in FIG. 2.

As shown in FIGS. 2 and 3, the clock (fixed clock) used in the prior art plasma display apparatus shown in FIG. 1 maintains a constant frequency (for example, 24 MHz, 40 MHz, 60 MHz, etc.) and, therefore, its frequency component is concentrated at frequency f0.

That is, the prior art plasma display apparatus uses a source clock, for example, of fixed frequency (f0), and drives internal circuits (for example, each circuit in the drive control section B, the address driver 5, etc.) using clocks derived by appropriately dividing the source clock. Based on the thus derived clocks, the internal circuits process video and other signals, generate a waveform for driving the display panel 1, and produce a display image by applying the drive waveform to the display panel 1.

Accordingly, the noise that the plasma display apparatus emits is noise arising from harmonics of the fundamental frequency of the source clock (f0) or the clocks derived from the source clock, etc.; since the display panel 1 is exposed to the outside, the noise caused by the drive waveform from the drive control section B is directly radiated or propagated. With increasing screen size in recent years, such noise emission from plasma display apparatuses is becoming an increasingly serious concern.

The reason for the noise emission associated with the use of a fixed-frequency clock will be explained. For example, the clock element is mounted on a printed circuit board and is used by providing necessary wiring; in this case, resonant lengths associated with the wiring length, board dimensions, structure dimensions, etc. show up and noise intensity is emphasized at frequencies corresponding to the resonant lengths. Further, in the case of a sinusoidal wave, only the fundamental frequency is the major issue, but in the case of a rectangular wave, which contains harmonics, noise is observed that shows peaks at frequencies corresponding to the integral multiples of the fundamental frequency.

Figure 4:
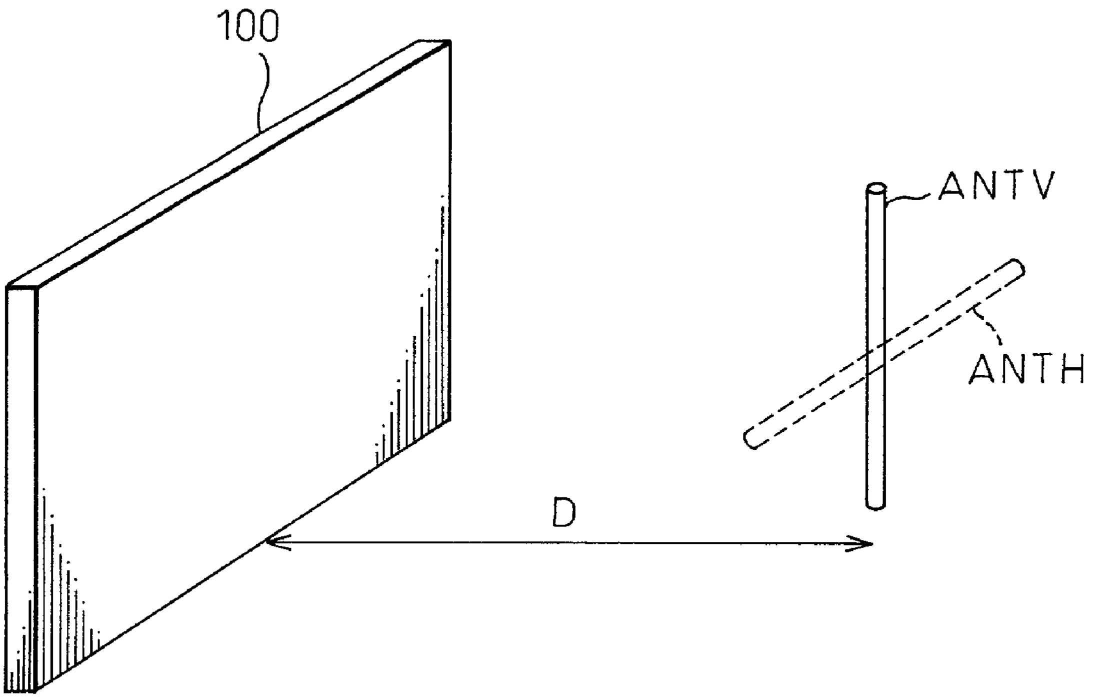
FIG. 4 is a diagram showing a setup for measuring noise being emitted from a plasma display apparatus.

FIG. 4 is a diagram showing a setup for measuring noise being emitted from a plasma display apparatus. In FIG. 4, reference numeral 100 is the plasma display apparatus (PDP module), ANTV is a vertical direction noise detection antenna for detecting noise in the vertical direction, ANTH is a horizontal direction noise detection antenna for detecting noise in the horizontal direction, and D is the distance (for example, 10 meters) between the PDP module 100 and the antennas ANTV and ANTH.

As shown in FIG. 4, noise emitted from the plasma display apparatus (PDP module) 100 is measured using the vertical direction noise detection antenna ANTV and horizontal direction noise detection antenna ANTH located at distance D (10 meters) from the PDP module 100.

Figure 5:
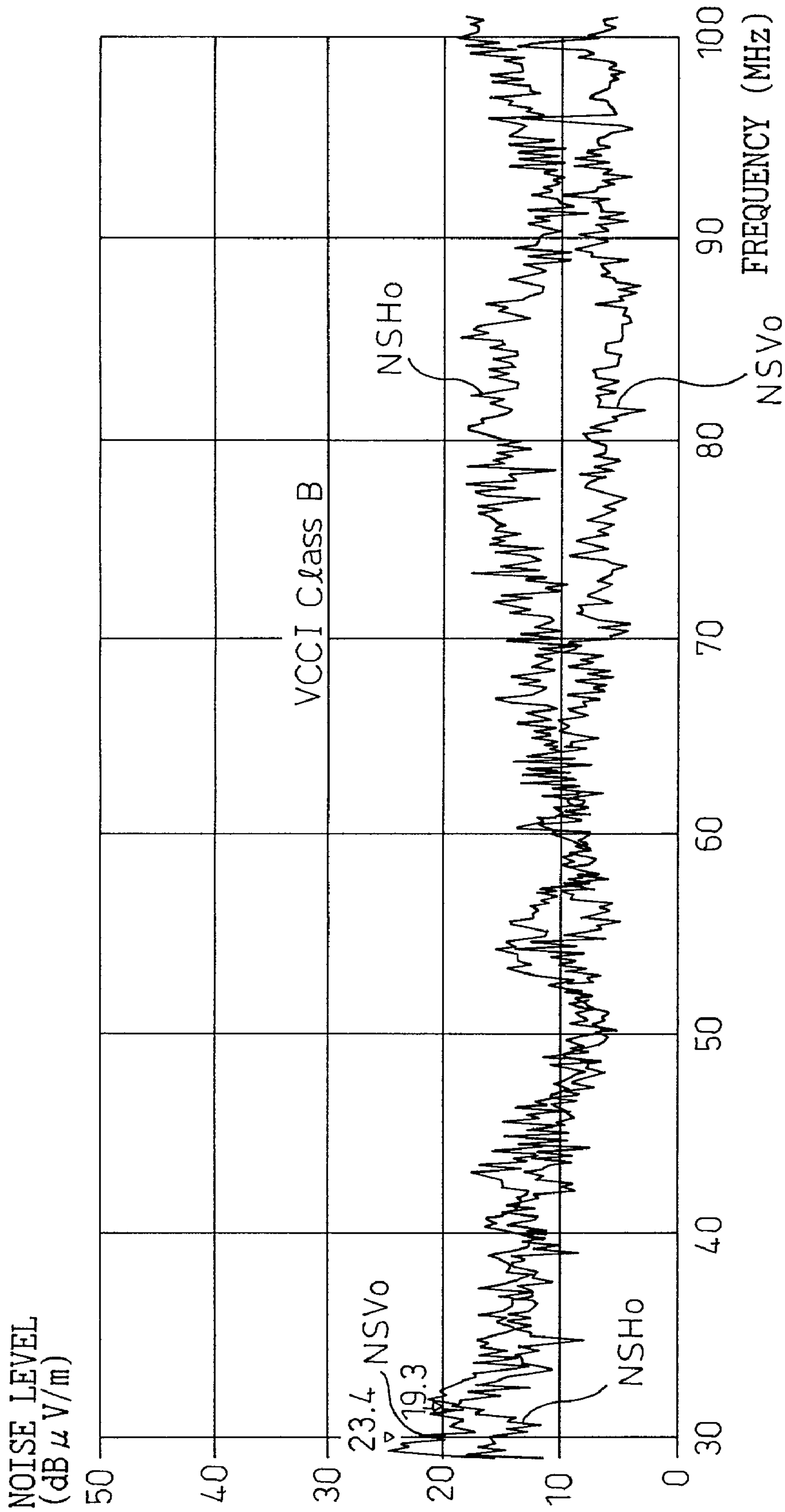
FIG. 5 is a diagram (part 1) showing the results of the measurements of noise emitted from the prior art plasma display apparatus shown in FIG. 1.
Figure 6:
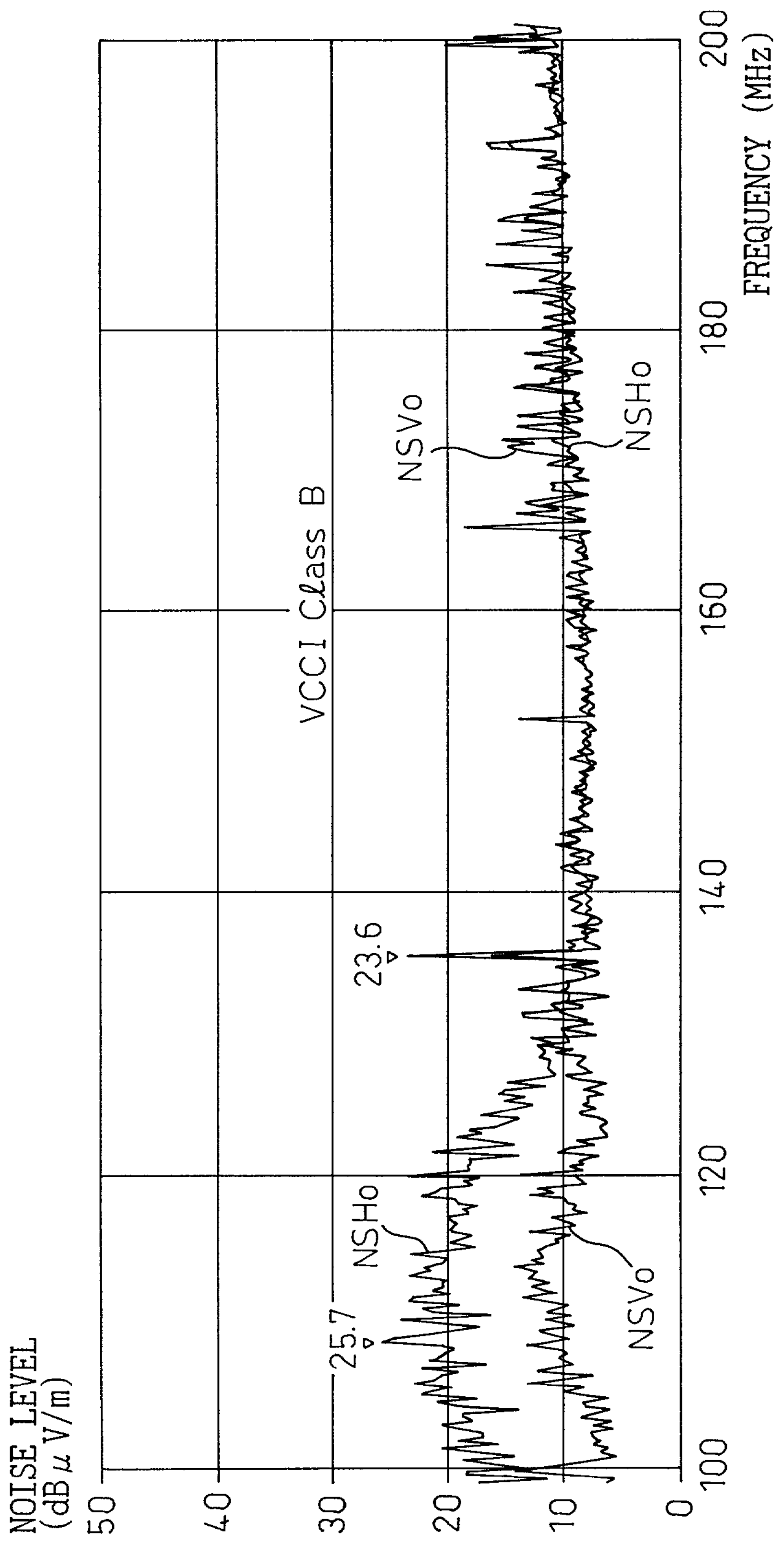
FIG. 6 is a diagram (part 2) showing the results of the measurements of noise emitted from the prior art plasma display apparatus shown in FIG. 1.

FIGS. 5 and 6 are diagrams showing the results of the measurements of the noise emitted from the prior art plasma display apparatus shown in FIG. 1; here, the measurements were made using the setup shown in FIG. 4. FIG. 5 shows noise levels in the frequency range of 30 MHz to 100 MHz, and FIG. 6 shows noise levels in the frequency range of 100 MHz to 200 MHz.

As shown in FIGS. 5 and 6, at the frequency near 30 MHz, for example, the noise emitted from the prior art PDP module to which the present invention is not applied reaches a maximum of 23.4 (dBμV/m) in the case of the vertical direction noise NSVO and a maximum of 19.3 (dBμV/m) in the case of the horizontal direction noise NSHO. Further, in the frequency range of about 70 MHz to 90 MHz, for example, the vertical direction noise NSVO reaches nearly 10 (dBμV/m), while the horizontal direction noise NSHO reaches nearly 20 (dBμV/m). Furthermore, in the frequency range of about 100 MHz to 120 MHz, for example, the vertical direction noise NSVo is about 10 to 15 (dBμV/m), while on the other hand, the horizontal direction noise NSHO exceeds 20 (dBμV/m) and reaches a maximum of 25.7 (dBμV/m).

To describe more specifically, while the plasma display apparatus meets, for example, VCCI Class B which defines noise requirements for home-use information apparatuses, it cannot be said that the apparatus clears the requirements by a sufficient margin. That is, when designing an actual plasma display apparatus, for example, the shield performance of the housing invariably drops because of the presence of holes for introducing cooling air, connectors provided for connecting cables, etc. Therefore, simply clearing the requirements is not sufficient, and the noise margin must always be increased to facilitate the design work.

Traditionally, in order to suppress the noise from plasma display apparatuses below specified levels, it has been practiced to make adjustments in such a manner as to dull the rising and falling edges of the display panel driving waveform, or to provide a shield structure by attaching a conductive transparent film to the display panel itself. However, adjusting the display panel driving waveform involves a problem in terms of stable operation since it reduces the operating margin of the apparatus, while attaching a conductive transparent film to the display panel causes the problem of reduced light transmittance and, hence, degradation of the display quality. These problems are not limited to plasma display apparatuses having the configuration such as shown in FIG. 1, but equally occur with plasma display apparatuses of other configuration and various other display devices such as liquid crystal displays.

Specific embodiments of the display apparatus of the present invention will be described below with reference to accompanying drawings.

Figure 7:
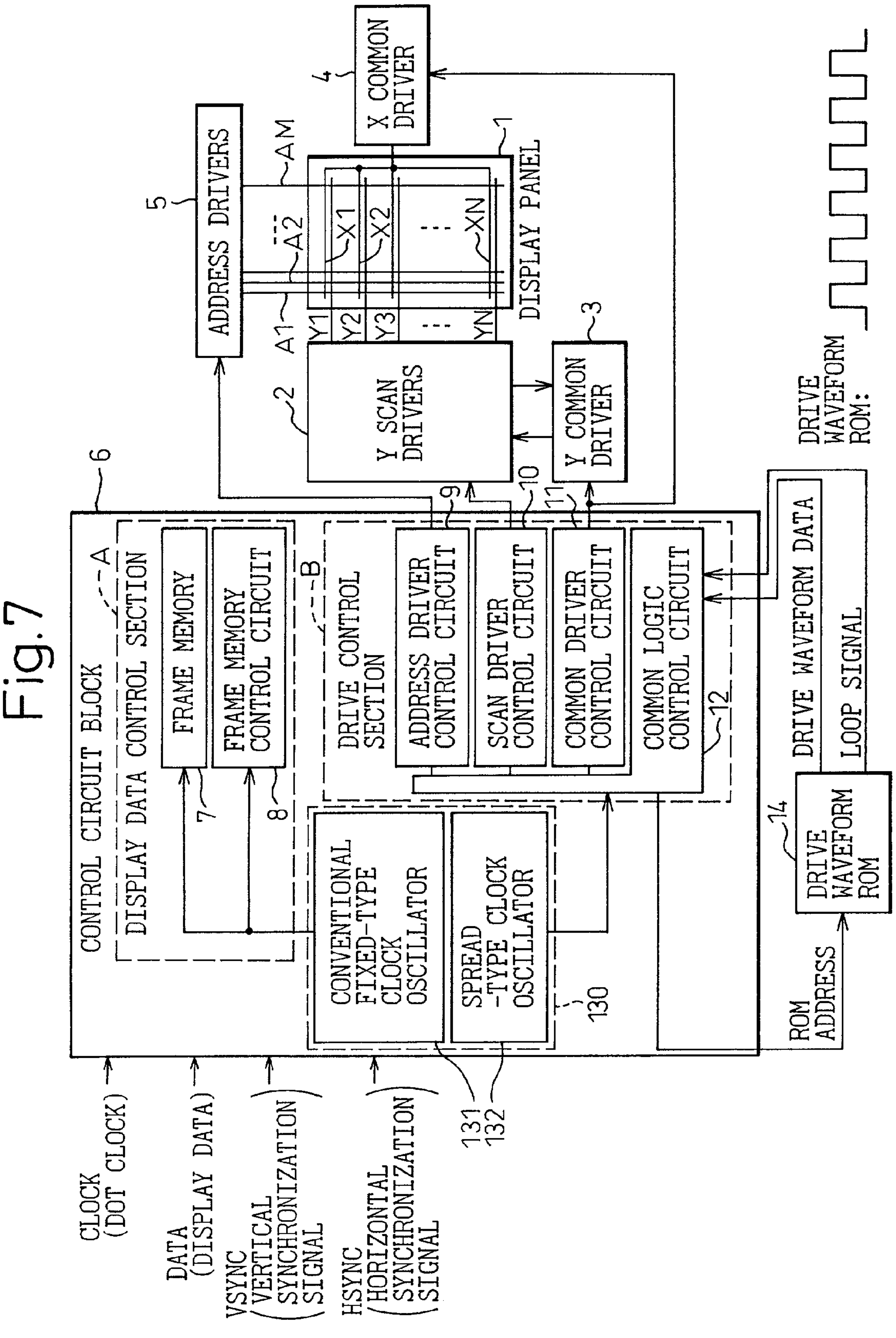
FIG. 7 is a block diagram showing a plasma display apparatus as a first embodiment of the display apparatus according to the present invention.

FIG. 7 is a block diagram showing a plasma display apparatus (three-electrode surface discharge AC-driven type, so called three-electrode AC-type, plasma display apparatus) as a first embodiment of the display apparatus according to the present invention. In FIG. 7, reference numeral 1 is a display panel, 2 is an array of Y scan drivers, 3 is a Y common driver, 4 is an x common driver, 5 is an array of address drivers, and 6 is a control circuit block. In the plasma display apparatus of the first embodiment shown in FIG. 7, the clock circuit 13 in the prior art plasma display apparatus shown in FIG. 1 is replaced by a clock circuit 130 which consists of a conventional fixed-type clock oscillator 131 for supplying a clock to the display data control section A and a spread-type clock oscillator 132 for supplying a clock to the drive control section B; otherwise, the configuration is the same as that of the prior art plasma display apparatus shown in FIG. 1.

That is, the display panel 1 comprises two glass substrates disposed opposite each other, one substrate being provided with Y electrodes Y1 to YN and X electrodes X1 to XN, i.e., sustain-discharge electrodes arranged parallel to each other, and the other substrate with address electrodes A1 to AM arranged at right angles to the sustain-discharge electrodes (X and Y electrodes). The Y electrodes (scan electrodes) Y1 to YN are driven by the Y scan drivers 2, X electrodes X1 to XN are connected together and driven by the X common driver 4, and the address electrodes A1 to AM are driven by the address drivers 5.

The control circuit block 6 comprises the display data control section A having a frame memory 7 and frame memory control circuit 8, the clock circuit 130 consisting of the fixed-type clock oscillator 131 and spread-type clock oscillator 132, and the drive control section B having an address driver control circuit 9, scan driver control circuit 10, common driver control circuit 11, and common logic control circuit 12. The control circuit block 6 receives a dot clock (CLOCK), display data (DATA), vertical synchronization signal (VSYNC), and horizontal synchronization signal (HSYNC), and displays the desired image on the display panel 1 by controlling the Y scan drivers 2, Y common driver 3, X common driver 4, and address drivers 5.

As described earlier, the clock circuit 130 consists of the fixed-type clock oscillator 131 for supplying a clock to the display data control section A and the spread-type clock oscillator 132 for supplying a clock to the drive control section B. The output (clock signal) of the fixed-type clock oscillator 131 is supplied to the frame memory 7 and frame memory control circuit 8, while the output (clock signal) of the spread-type clock oscillator 132 is supplied to the common logic control circuit 12. The drive waveform ROM 14 receives an address signal (ROM address) from the common logic control circuit 12, and supplies corresponding drive waveform data and a loop signal to the common logic control circuit 12.

In the first embodiment, the drive control section B is supplied with the output clock of the spread-type clock oscillator 132 whose frequency varies with time within a given range centered about a set frequency, as will be described in detail later, and the address driver control circuit 9, scan driver control circuit 10, and common driver control circuit 11 operate in synchronism with the output clock of the spread-type clock oscillator 132, so that the frequency of the output waveform also varies with time. This serves to suppress the peaks of the noise emitted from various portions of the display apparatus (display panel 1), improving the noise characteristics of the apparatus as a whole.

The principle of the present invention for the improvement of the noise characteristics will be described below. In the case of a fixed-frequency clock such as used in the prior art, the observed spectrum has high wavelength selectivity and exhibits very sharp peaks, but when a clock of a periodically varying frequency is used as in the present invention, the peak values of the spectrum are reduced and the spectral shape changes to one that is wide in the wavelength direction. This is because time occupancy of any particular frequency decreases and the noise is spread out in the frequency direction; in principle, the total amount of energy does not change and, therefore, the area that the spectrum occupies remains unchanged but only the shape changes. Since what actually causes the problem is the absolute intensity of the noise, not its distribution, the spectral shape change thus accomplished can be regarded as achieving a reduction in noise. According the principle described above, since no changes are made to the rising/falling characteristics of each waveform, ill effects are not caused to the operating margin of the plasma display apparatus.

Figure 8:
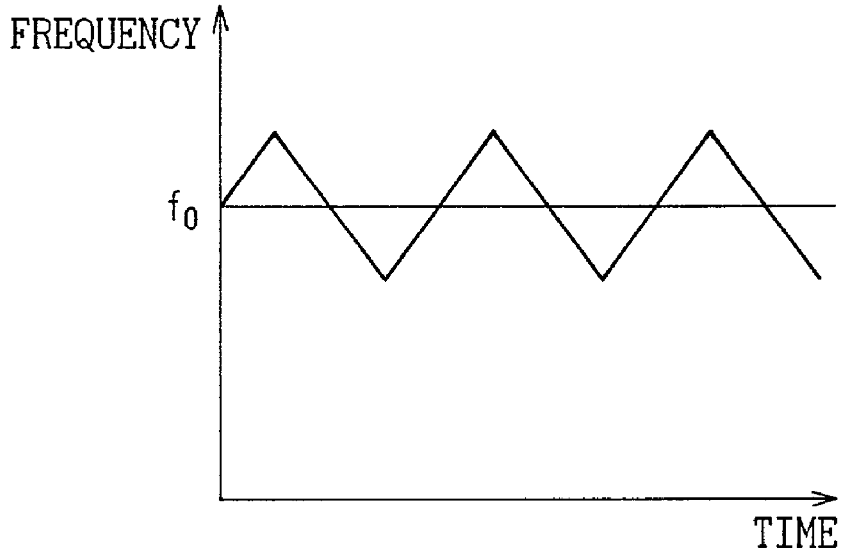
FIG. 8 is a diagram showing the frequency versus time relationship of the clock (spread-type clock) used in the plasma display apparatus of the first embodiment of the invention shown in FIG. 7.
Figure 9:
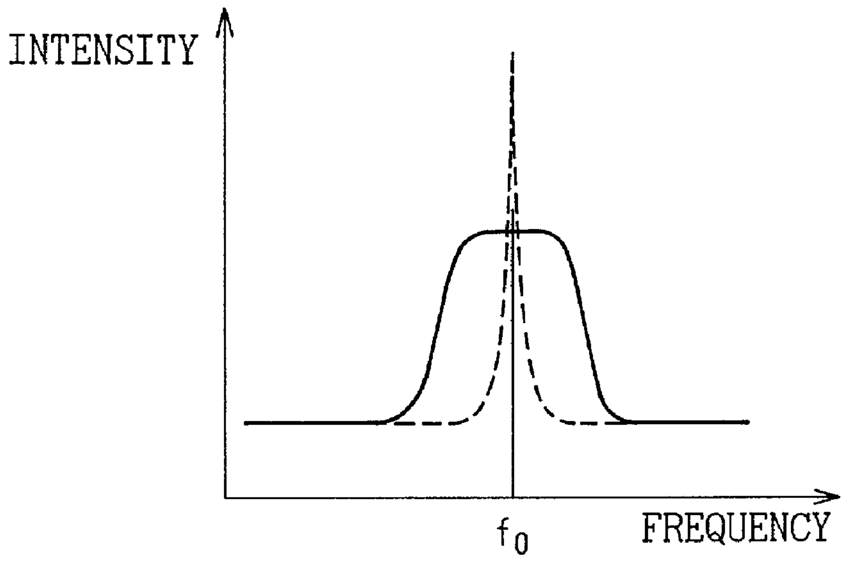
FIG. 9 is a diagram showing the intensity versus frequency relationship of the spread-type clock shown in FIG. 8.

FIG. 8 is a diagram showing the frequency versus time relationship of the clock (spread-type clock) used in the plasma display apparatus of the first embodiment of the invention shown in FIG. 7, and FIG. 9 is a diagram showing the intensity versus frequency relationship of the spread-type clock shown in FIG. 8. The dashed line in FIG. 9 shows the output of the fixed-type clock oscillator (13) previously shown in FIG. 3.

In the first embodiment, the clock supplied to the common logic control circuit 12 in the drive control section B is the output of the spread-type clock oscillator 132, as illustrated in FIG. 7, and this output has the characteristics shown in FIGS. 8 and 9. That is, the spread-type clock oscillator 132 outputs a clock whose frequency varies with time in a continuous manner within a range of, for example, plus or minus a few percent of a reference frequency (f0: for example, 40 MHz) (in a specific example, the clock frequency varies within a range of plus or minus about one percent, that is, a few hundred KHZ, for example, 100 KHz).

As described above, in the plasma display apparatus of the first embodiment of the invention, the output of the spread-type clock oscillator 132 whose frequency varies with time is supplied to the common logic control circuit 12 to generate the drive waveform for the display panel 1. In this way, when the spread-type clock oscillator 132 is used, the noise that the display panel 1 emits can be spread out thereby reducing the peak values of the noise.

More specifically, when a continuous clock of a constant frequency, such as shown in FIG. 2, is used, the higher the frequency stability the greater is the Q value of the frequency characteristic of the waveform, producing a sharper peak greater in amplitude (see FIG. 3). By contrast, in the first embodiment which uses the spread-type clock oscillator 132, the clock frequency varies as shown in FIG. 8, and time occupancy of any particular frequency decreases, as a result of which the peak values of the frequency characteristic are reduced (see FIG. 9).

Figure 10:
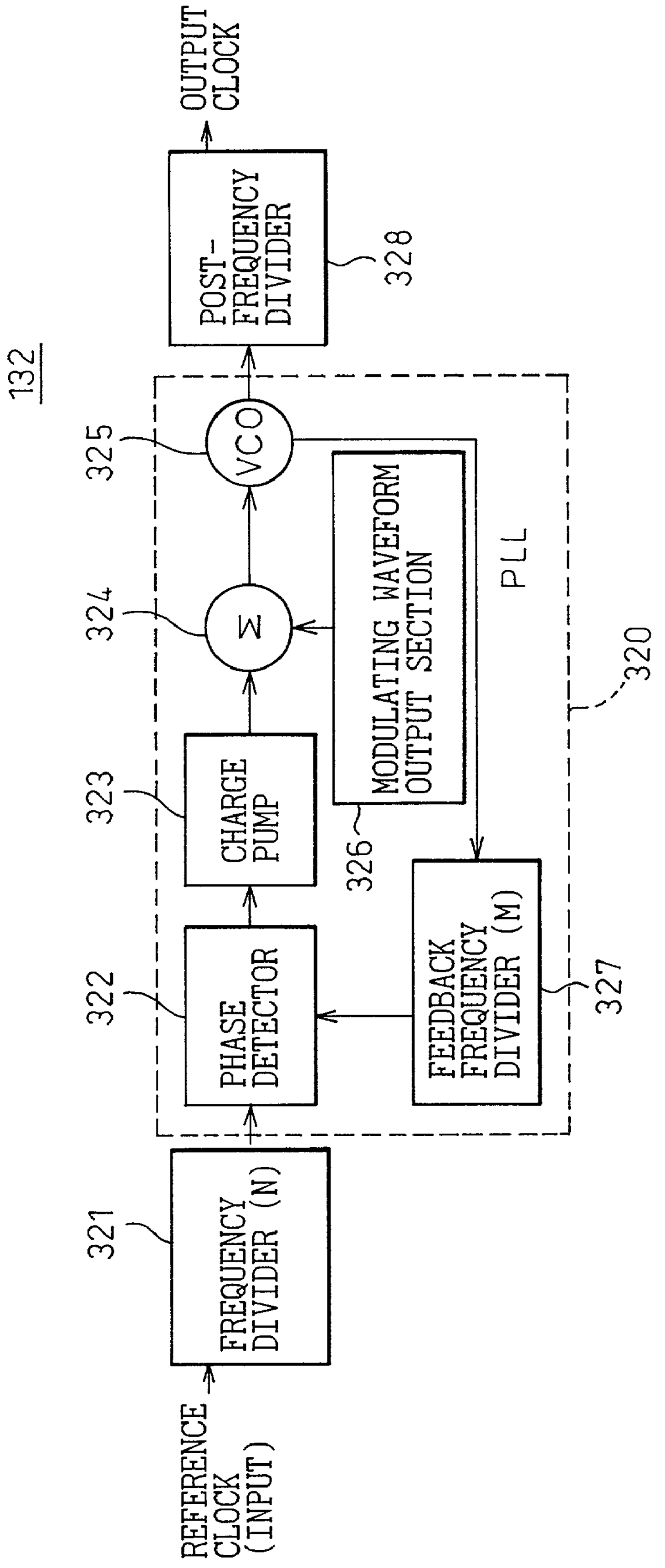
FIG. 10 is a block diagram showing one example of a spread-type clock oscillator in the plasma display apparatus of the first embodiment of the invention shown in FIG. 7.

FIG. 10 is a block diagram showing one example of the spread-type clock oscillator 132 in the plasma display apparatus of the first embodiment of the invention shown in FIG. 7; this example shows a prior known configuration. In FIG. 10, reference numeral 320 is a PLL (Phase Locked Loop) circuit, 321 is a frequency divider which divides the frequency of the input reference clock by a factor of N, and 328 is a post-frequency divider which divides the frequency of the output of the PLL circuit 320.

As shown in FIG. 10, the PLL circuit 320 comprises a phase detector (phase comparator) 322, a charge pump 323, an adder 324, a voltage controlled oscillator (VCO) 325, a modulating waveform output section 326, and a feedback frequency divider 327. The phase detector 322 compares the phase of the output of the frequency divider 321 with that of the output of the feedback frequency divider 327, and the charge pump 323 and the VCO 325 are controlled so that the above two outputs match in phase. The feedback frequency divider 327 divides the frequency of the output of the VCO 325 by M and supplies the result to the phase detector 322. The adder 324, placed between the charge pump 323 and the VCO 325, controls the VCO 325 by adding an output from the modulating waveform output section 326 to the output of the charge pump 323.

Using the spread-type clock oscillator 132 having the above-described configuration, a clock whose frequency varies around a reference frequency (f0) as a function of time can be obtained.

Figure 11:
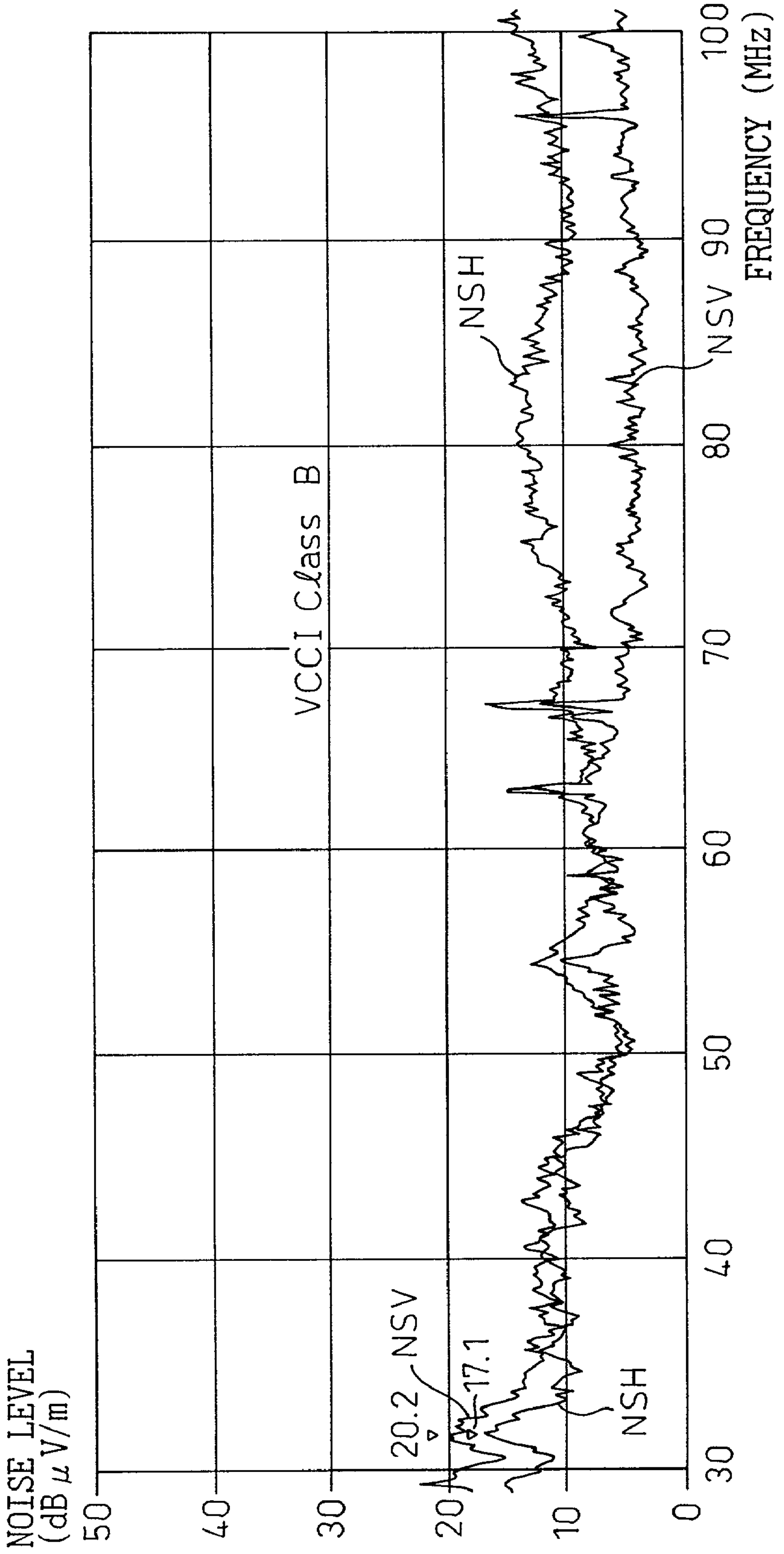
FIG. 11 is a diagram (part 1) showing the results of the measurements of noise emitted from the plasma display apparatus of the first embodiment of the invention shown in FIG. 7.
Figure 12:
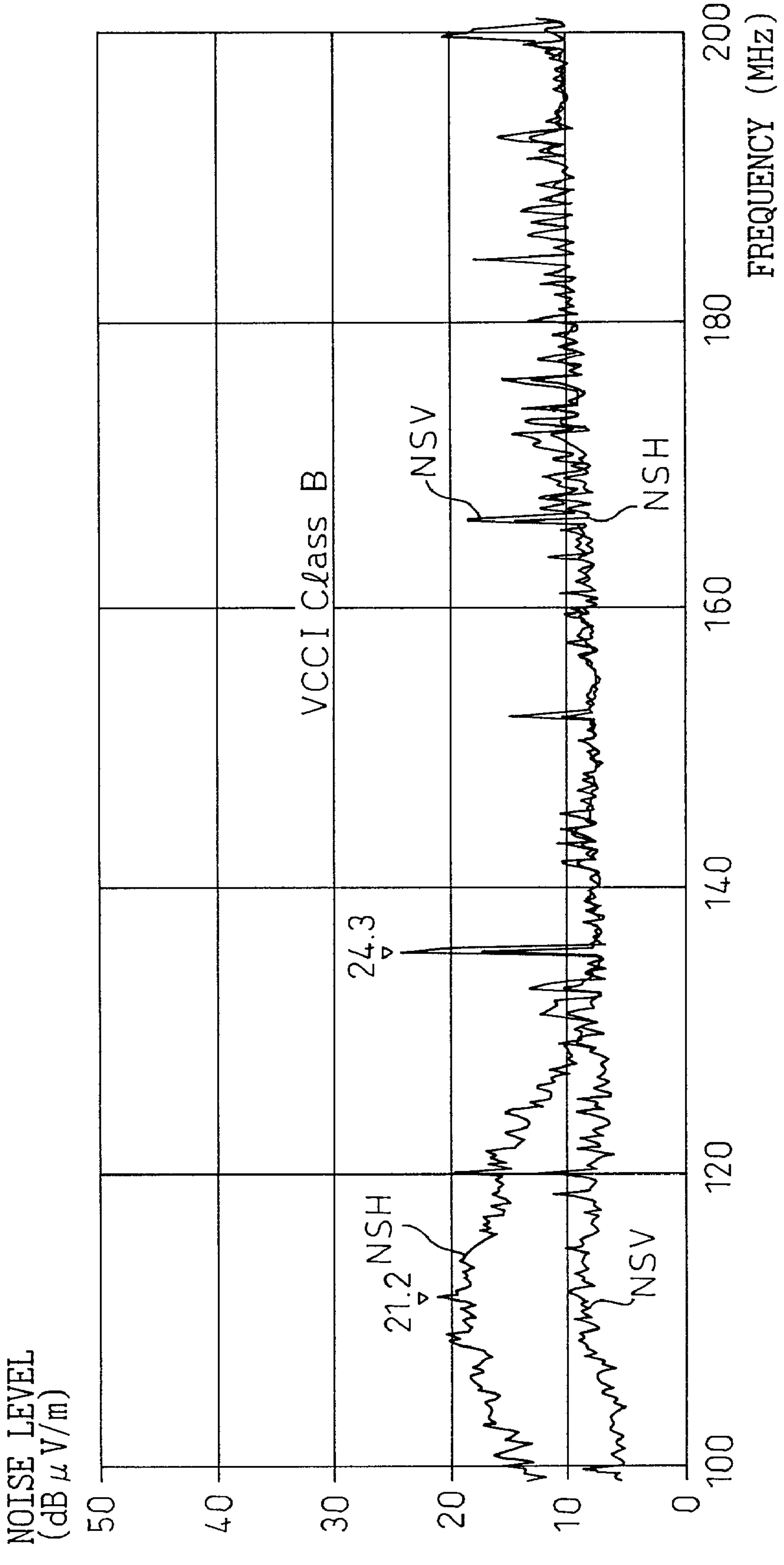
FIG. 12 is a diagram (part 2) showing the results of the measurements of noise emitted from the plasma display apparatus of the first embodiment of the invention shown in FIG. 7.

FIGS. 11 and 12 are diagrams showing the results of the measurements of the noise emitted from the plasma display apparatus of the first embodiment of the invention shown in FIG. 7; the measurements were made using the setup shown in FIG. 4. FIG. 11 shows noise levels in the frequency range of 30 MHZ to 100 MHz, and FIG. 12 shows noise levels in the frequency range of 100 MHz to 200 MHz.

As shown in FIGS. 11 and 12, at the frequency near 30 MHZ, for example, the noise emitted from the plasma display apparatus (PDP module) of the first embodiment is 20.2 (dBμV/m) at maximum in the case of the vertical direction noise NSV and 17.1 (dBμV/m) at maximum in the case of the horizontal direction noise NSH. Further, in the frequency range of about 70 MHz to 90 MHz, for example, the vertical direction noise NSV is around 5 (dBμV/m), while the horizontal direction noise NSH is less than about 15 (dBμV/m). Furthermore, in the frequency range of about 100 MHZ to 120 MHZ, for example, the vertical direction noise NSV is less than about 10 (dBμV/m), and the horizontal direction noise NSH is about 20 (dBμV/m) and 21.2 (dBμV/m) at maximum.

As is apparent from a comparison between the previously given FIGS. 5 and 6 and the above-described FIGS. 11 and 12, the peak values of the noise emitted from the plasma display apparatus to which the present invention is applied are greatly reduced compared with those of the noise emitted from the plasma display apparatus to which the present invention is not applied, and the effect is achieved for all the harmonic components involved. In this way, according to the first embodiment, by varying the operating frequency of the plasma display apparatus as a function of time, the intensity of noise can be reduced over the entire frequency range concerned, while avoiding degradation of the operating margin and display quality of the apparatus. The adjustment according to the present invention (control of the clock used to drive the display panel) is performed, for example, during a quiescent period (the period remaining after subtracting the operating period of one frame from Vsync).

Figure 13:
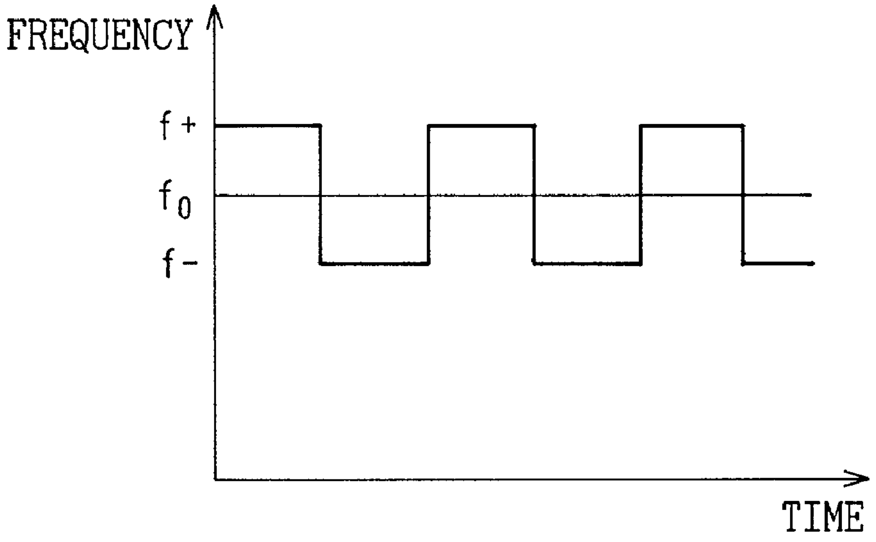
FIG. 13 is a diagram showing the clock frequency versus time relationship for explaining a modified example of the plasma display apparatus of the first embodiment of the invention shown in FIG. 7.
Figure 14:
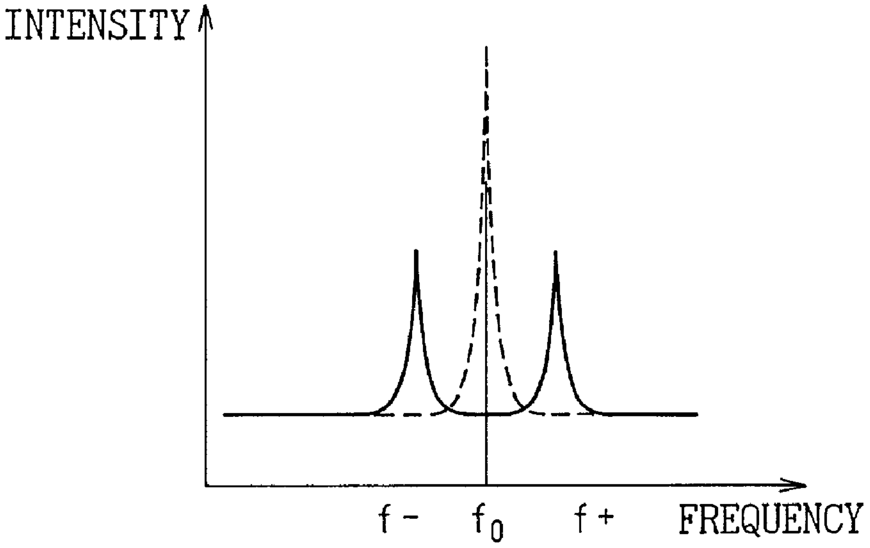
FIG. 14 is a diagram showing the intensity versus frequency relationship of the clock shown in FIG. 13.

FIG. 13 is a diagram showing the clock frequency versus time relationship for explaining a modified example of the plasma display apparatus of the first embodiment of the invention shown in FIG. 7, and FIG. 14 is a diagram showing the intensity versus frequency relationship of the clock shown in FIG. 13.

In the foregoing first embodiment, the frequency was varied with time in a continuous manner, as shown in FIGS. 8 and 9, but instead, the frequency may be varied in an on-off fashion between two frequencies (f+ and f−) preset, for example, within a range of plus or minus a few percent (for example, plus or minus about one percent) of the reference frequency (f0). The frequencies thus preset are not limited to the two frequencies (f+ and f−) set above and below the reference frequency (f0), but four frequencies may be set, for example, two at plus/minus 0.5 percent and two at plus/minus one percent of the reference frequency (f0), and the clock frequency may be varied between these four frequencies. In this modified example also, since no changes are made to the rising/falling characteristics of each waveform, ill effects are not caused to the operating margin of the plasma display apparatus.

Figure 15:
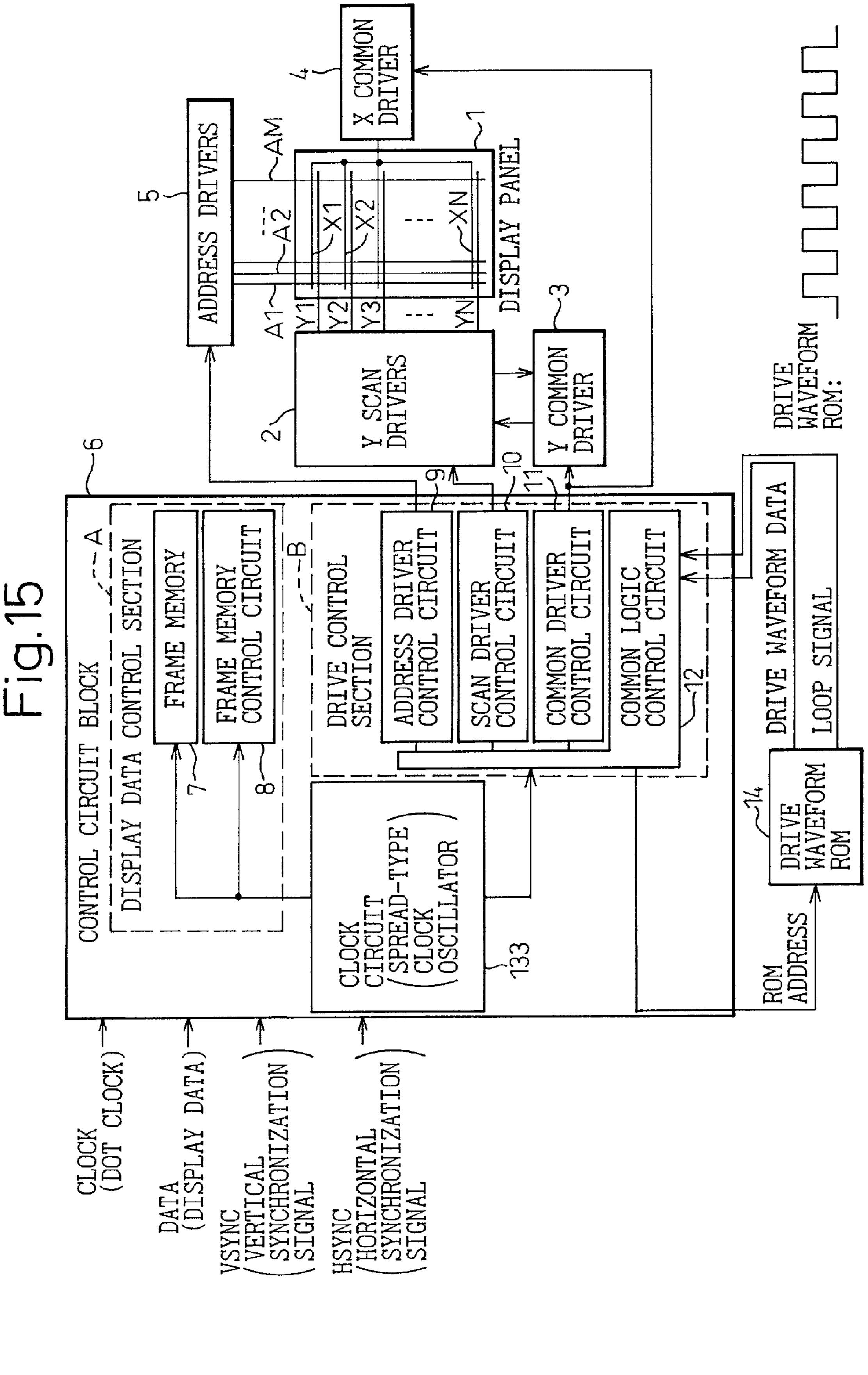
FIG. 15 is a block diagram showing a plasma display apparatus as a second embodiment of the display apparatus according to the present invention.

FIG. 15 is a block diagram showing a plasma display apparatus as a second embodiment of the display apparatus according to the present invention.

As can be seen from a comparison between FIG. 15 and FIG. 7, the plasma display apparatus of the second embodiment differs from the plasma display apparatus of the first embodiment in that the clock circuit 130 in the first embodiment is replaced by a single spread-type clock oscillator 133.

That is, in the first embodiment, the output clock of the spread-type clock oscillator 132 whose frequency continuously varies with time was supplied only to the drive control section B (the common logic control circuit 12), and the output of the fixed-type clock oscillator 131 was supplied as the clock for the display data control section A (the frame memory 7 and frame memory control circuit 8); by contrast, in the second embodiment, the output clock of the spread-type clock oscillator 133 (clock circuit) whose frequency continuously varies with time is supplied to both the display data control section A and the drive control section B.

Here, the noise that the plasma display apparatus emits is primarily attributable to the drive waveform supplied to the display panel 1 via the drive control section B, and the effect of reducing the noise intensity over the entire frequency range can be achieved with the above-described first embodiment. The second embodiment illustrated here is intended to reduce not only the noise attributable to the drive waveform supplied to the display panel 1 via the drive control section B, but also the intensity of the noise emitted via the display data control section A. Otherwise, the configuration is the same as that of the first embodiment.

Figure 16:
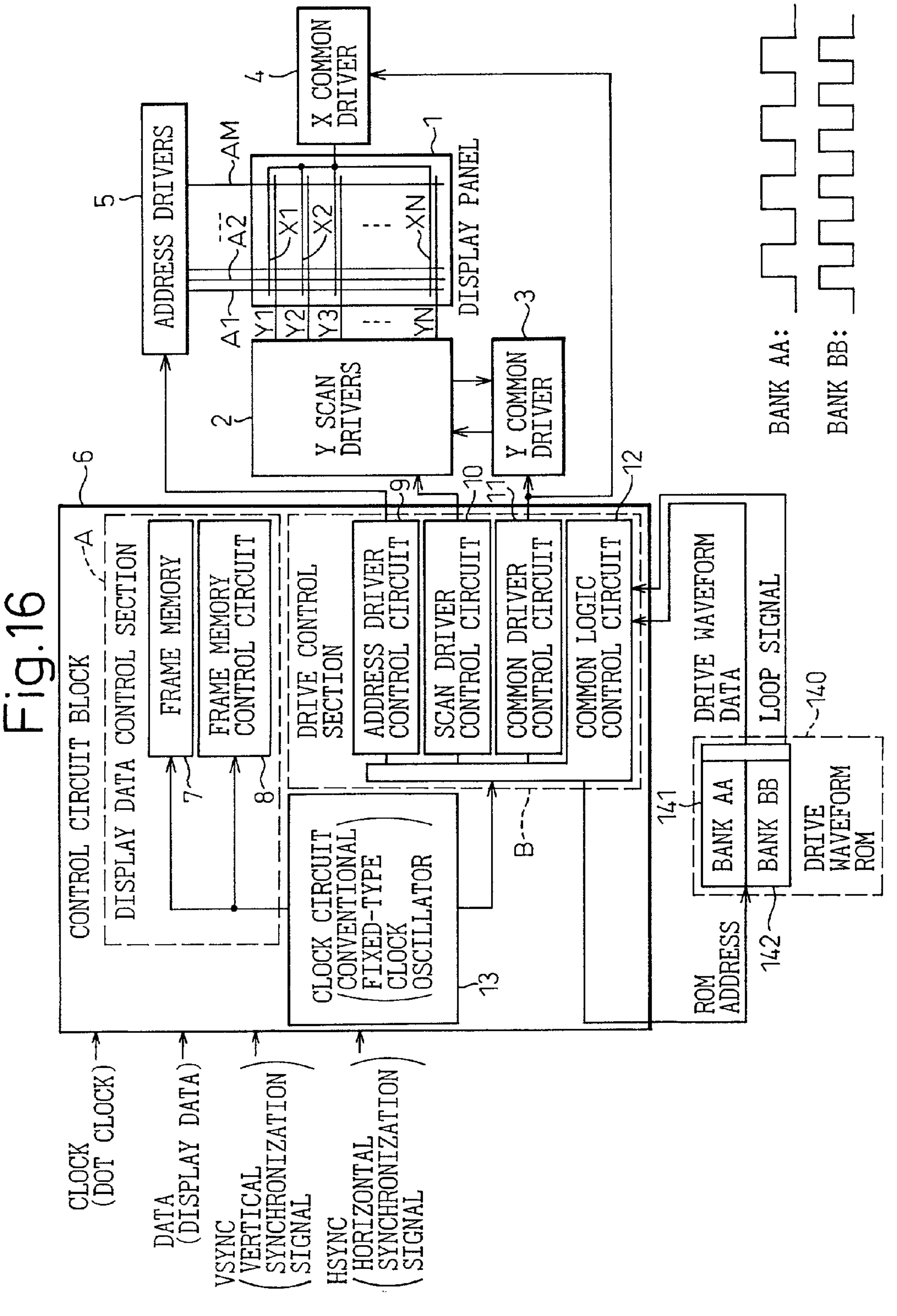
FIG. 16 is a block diagram showing a plasma display apparatus as a third embodiment of the display apparatus according to the present invention.

FIG. 16 is a block diagram showing a plasma display apparatus as a third embodiment of the display apparatus according to the present invention.

As shown in FIG. 16, in the plasma display apparatus of the third embodiment, the clock circuit 13 is configured as a fixed-type clock oscillator as in the prior art shown in FIG. 1. In the third embodiment, however, the drive waveform ROM 140 has two banks (bank AA: 141, bank BB: 142), and control signals having different frequencies (drive waveform data and loop signal) are stored in the respective banks 141 and 142. The control signals stored in the respective banks 141 and 142 are output alternately, for example, for each frame, and the drive waveform for the display panel 1 is generated in accordance with the control signal whose frequency differs for each frame. This achieves the same effect as varying the clock frequency in an on-off fashion between two different frequencies (f+ and f−) as previously described in connection with FIGS. 13 and 14. The number of banks of the drive waveform ROM 140 is not limited to the two banks described above, nor is the output timing of the control signals of different frequencies stored in these banks limited to each frame or subframe timing, and it will be appreciated that various modifications can be made.

Figure 17:
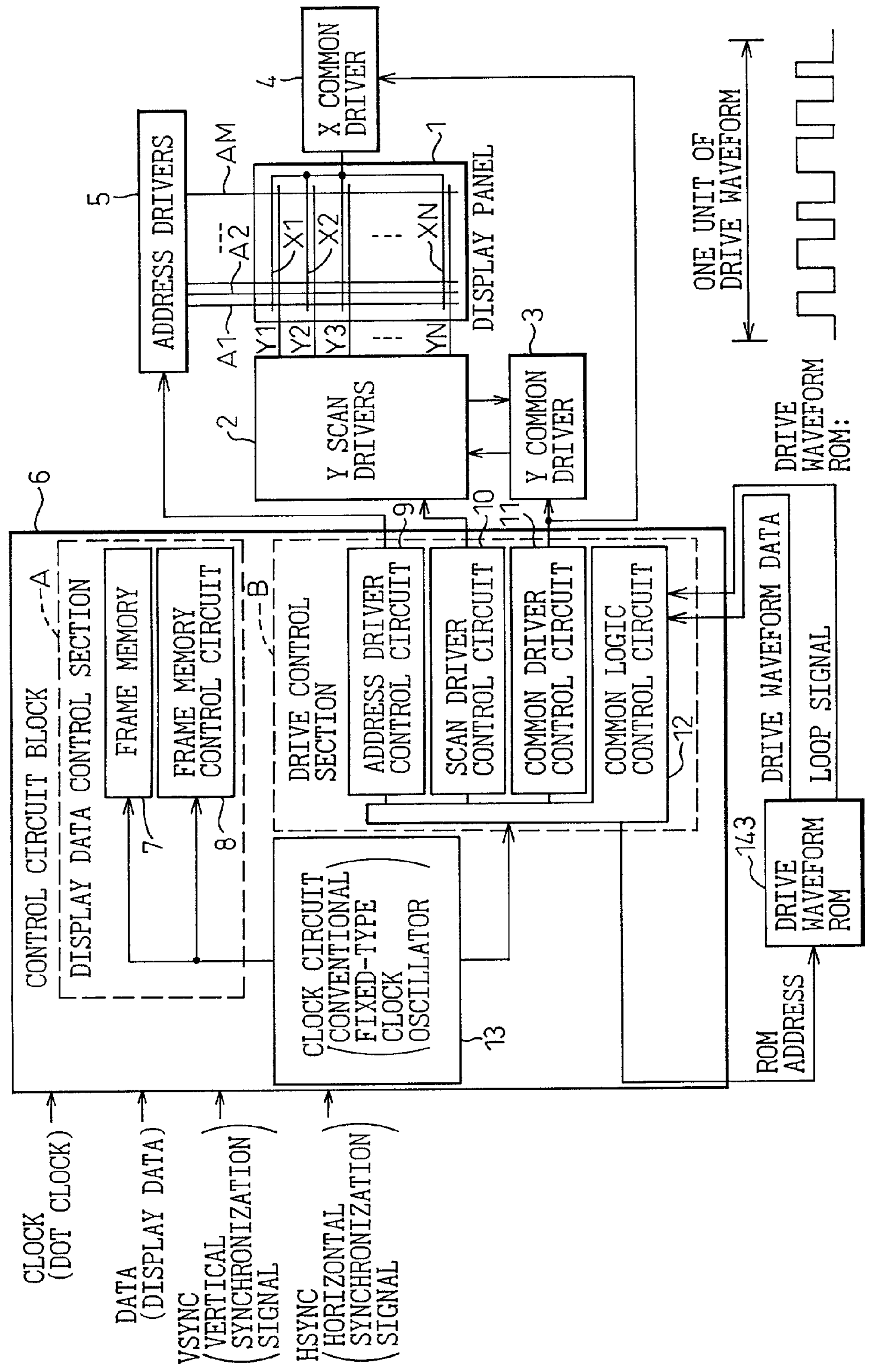
FIG. 17 is a block diagram showing a plasma display apparatus as a fourth embodiment of the display apparatus according to the present invention.

FIG. 17 is a block diagram showing a plasma display apparatus as a fourth embodiment of the display apparatus according to the present invention.

As is apparent from a comparison between FIG. 17 and FIG. 1, the plasma display apparatus of the fourth embodiment is characterized in that the drive waveform ROM 143 stores a drive waveform whose frequency itself varies. More specifically, in the prior art example shown in FIG. 1, drive waveform data of constant frequency is stored in the drive waveform ROM 14, but in the fourth embodiment, drive waveform data of varying frequency is stored as one unit of drive waveform in the drive waveform ROM 143, and the drive waveform for driving the display panel 1 is generated by reading out the drive waveform data of varying frequency stored in the drive waveform ROM 143. In the fourth embodiment, by storing drive waveform data corresponding to multiple frequencies as one unit of drive waveform in the drive waveform ROM 143, the noise caused by the waveform and emitted from the display panel can be spread out to reduce the peak values of the noise.

As described above, in the plasma display apparatus of each embodiment of the present invention, since no changes are made to the rising/falling characteristics of each waveform, the peak values of the noise that the apparatus emits can be reduced without affecting the operating margin of the apparatus and while ensuring stable operation. Furthermore, since the need to provide a shield structure by attaching a conductive transparent film to the display panel, for example, is alleviated, the peak values of the noise that the apparatus emits can be reduced without causing the degradation of display quality associated with a reduction in light transmittance.

The above embodiments have been described by dealing primarily with a three-electrode surface discharge AC-driven type plasma display apparatus, but the invention is not particularly limited to the three-electrode surface discharge AC-driven type plasma display apparatus, but is equally applicable to various display apparatuses such as plasma display apparatuses (or liquid crystal displays) having other configurations.

As described in detail above, according to the display apparatus of the present invention, the intensity of noise can be reduced over the entire frequency range concerned, while avoiding degradation of various characteristics.

Many different embodiments of the present invention may be constructed without departing from the spirit and scope of the present invention, and it should be understood that the present invention is not limited to the specific embodiments described in this specification, except as defined in the appended claims.

What is claimed is:

1. A driving method for a display apparatus, wherein drive waveforms for a display panel are provided corresponding to at least two frequencies, and said display panel is driven by sequentially switching an output drive waveform between said drive waveforms corresponding to said at least two frequencies, said drive waveforms for said display panel corresponding to two frequencies lying within plus or minus 1 percent of a reference frequency.

2. A driving method for a display apparatus, wherein a frequency of a clock signal, used to drive a display panel, is continuously varied within a range of plus or minus 1 percent of a reference frequency, and said display panel is driven with said frequency varying clock signal.

3. A driving method for a display apparatus, comprising:

continuously varying a frequency of a clock signal within a range of plus or minus 1 percent of a reference frequency; and driving a display panel with said continuously varying frequency clock signal.

4. A display apparatus including a display panel to display an image, comprising:

a clock generating circuit to generate a clock signal having a continuously varying frequency varied within a range of plus or minus 1 percent of a reference frequency; and a drive waveform generating circuit generating a drive waveform having a frequency varying in accordance with said frequency varying clock signal and driving the display panel in accordance with the generated drive waveform.

* * * * *

UNITED STATES PATENT AND TRADEMARK OFFICE

CERTIFICATE OF CORRECTION

PATENT NO. : 7,193,596 B2 
APPLICATION NO. : 09/760883
DATED : March 20, 2007
INVENTOR(S) : Hiroyuki Shibata et al.

It is certified that error appears in the above-identified patent and that said Letters Patent is hereby corrected as shown below:

First Page, Column 1 (Title), Line 3, change “DISPLAY APPARATUS WITH REDUCED NOISE EMISSION AND DRIVING METHOD FOR DISPLAY APPARATUS” to --DISPLAY APPARATUS WITH REDUCED NOISE EMISSION AND DRIVING METHOD FOR THE DISPLAY APPARATUS--.

Column 1 (Title), Line 3, change “DISPLAY APPARATUS WITH REDUCED NOISE EMISSION AND DRIVING METHOD FOR DISPLAY APPARATUS” to --DISPLAY APPARATUS WITH REDUCED NOISE EMISSION AND DRIVING METHOD FOR THE DISPLAY APPARATUS--.

Signed and Sealed this

Thirty-first Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 7,193,596 B2
APPLICATION NO. : 09/760883
DATED : January 17, 2001
INVENTOR(S) : Hiroyuki Shibata et al.

It is certified that error appears in the above-identified patent and that said Letters Patent is hereby corrected as shown below:

Title page, Item (73) Assignee: after HITACHI, LTD., Tokyo (JP)
Insert, at the next line: --FUJITSU HITACHI PLASMA DISPLAY LIMITED, Kawasaki (JP)--.

Signed and Sealed this

Sixteenth Day of March, 2010

David J. Kappos

*Director of the United States Patent and Trademark Office*